(12) United States Patent
Hashizume

(10) Patent No.: US 6,522,520 B2
(45) Date of Patent: Feb. 18, 2003

(54) APPARATUS COVER CASE STRUCTURE AND ELECTRONIC APPARATUS

(75) Inventor: Kenichi Hashizume, Yoshioka-machi (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/940,483

(22) Filed: Aug. 29, 2001

(65) Prior Publication Data

US 2002/0053447 A1 May 9, 2002

(30) Foreign Application Priority Data

Aug. 31, 2000 (JP) ........................................ 2000-263920

(51) Int. Cl.⁷ .............................. H01G 4/00; H01G 2/10
(52) U.S. Cl. ...................... 361/301.3; 361/517; 361/535
(58) Field of Search ....................... 361/301.3, 517–519, 361/535–537; 429/100, 164, 163, 162, 176, 177, 99, 121

(56) References Cited

U.S. PATENT DOCUMENTS 5,642,255 A * 6/1997 Suzuki et al. ............... 361/517
5,771,149 A * 6/1998 Osaki et al. ................. 361/303
5,978,203 A * 11/1999 Kiyomura et al. ....... 361/301.3
6,000,469 A   12/1999 Van Lerberghe
6,004,690 A * 12/1999 Van Lerberghe ............ 429/100
6,020,086 A    2/2000 Van Lerberghe

FOREIGN PATENT DOCUMENTS

GB        2271666         4/1994
GB        2271666 A  *    4/1994

* cited by examiner

Primary Examiner—Anthony Dinkins
(74) Attorney, Agent, or Firm—Antonelli, Terry, Stout, & Kraus, LLP

(57) ABSTRACT

An apparatus cover case structure which includes a sheet-like core layer which includes an electric element, laminate film layers which are respectively arranged on upper and lower surfaces of the core layer, and cover case layers which are respectively arranged on an upper surface of the upper laminate film layer and a lower surface of the lower laiminate film layer, thereby to form a sandwich structure. The apparatus cover case structure can make an electronic apparatus, such as portable telephone, smaller in size, lighter in weight and thinner in structure.

21 Claims, 1 Drawing Sheet

Fig. 1
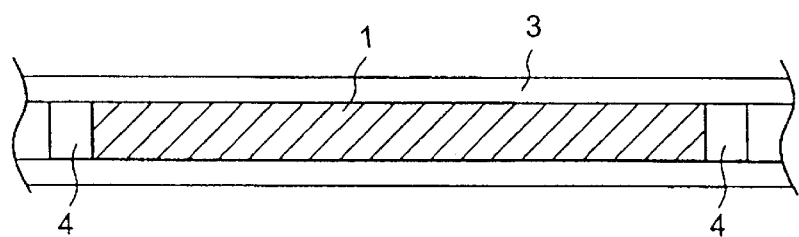
Fig. 2
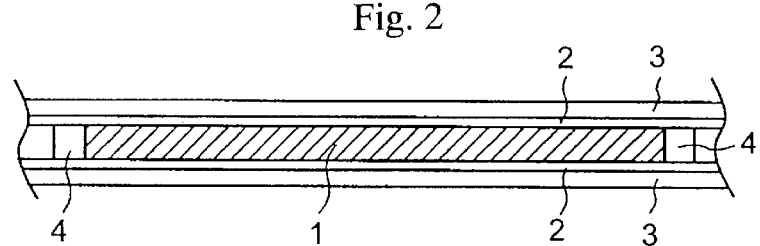
Fig. 3
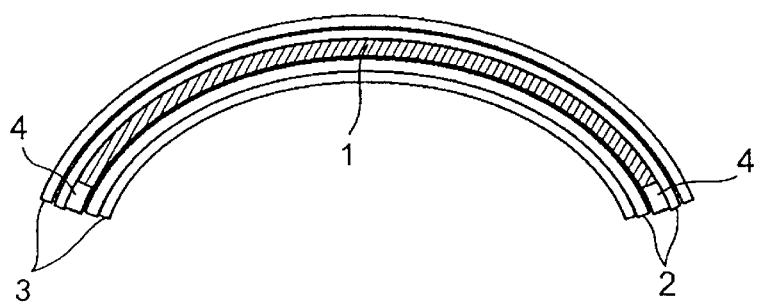
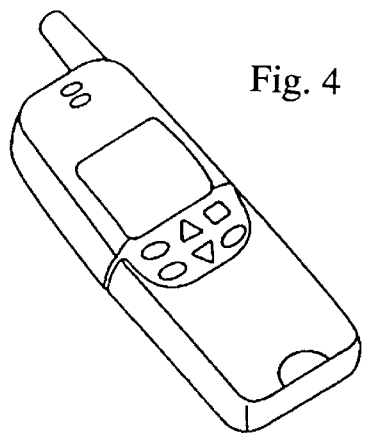
Fig. 4

APPARATUS COVER CASE STRUCTURE AND ELECTRONIC APPARATUS

This application claims the Paris convention priority of Japanese patent application 2000-263920 filed on Aug. 31, 2000, the entire disclosure of which is incorporated herein by reference.

BACKGROUND OF THE INVENTION

1. Field of the Invention

The present invention relates to the structure of the cover case of an electronic apparatus such as portable telephone, radio equipment, information terminal equipment, portable personal computer, or mobile communication terminal. It also relates to such an electronic apparatus.

2. Description of the Related Art

An electronic apparatus such as portable telephone is constructed including an apparatus cover case, and has various electronic elements, electric components etc. installed therein. In such an electronic apparatus, in recent years, a large number of requests have been eagerly made, not only for a higher performance and more functions, but also for a smaller size, a lighter weight, a thinner structure, etc. Accordingly, persons engaged in the art are constantly endeavoring to develop a compact apparatus of good design.

As to the portable telephone, in installing a large-sized LCD (liquid crystal display) within the small-sized housing of the apparatus, a space for mounting the LCD needs to be held inevitably, so that the installation must be coped with by making the other constituent members compact. Besides, a cover case which is thin, light, and high in strength must be used for protecting the constituent members included inside.

Since, however, the large number of required electronic elements, electric components etc. must be installed within the housing of the apparatus, a thin and compact construction as the whole apparatus has not heretofore been realized with ease. Moreover, since a battery and passive elements such as capacitors, indispensable to the apparatus, assume a considerable space inside the apparatus, a design for compaction has not been easy. In this regard, if expensive components are used for the compaction, the electronic apparatus itself rises in cost much.

SUMMARY OF THE INVENTION

The present invention has been made in view of the problems of the prior art as stated above, and has for its object to provide an apparatus cover case structure which contributes to make an electronic apparatus smaller in size, lighter in weight, thinner, etc. and which permits a large-sized LCD (liquid crystal display) to be installed, and the electronic apparatus which includes the apparatus cover case structure.

In order to accomplish the above object, an apparatus cover case and an electronic apparatus according to the present invention are constructed as stated below. Incidentally, reference numerals affixed agree with those indicated in the drawings.

(1) An apparatus cover case structure comprising a sheet-like core layer 1 which includes an electric element, and cover case layers 3 which are respectively arranged as outer layers holding said core layer 1 therebetween, thereby to form a sandwich structure.

(2) An apparatus cover case structure comprising a sheet-like core layer 1 which includes an electric element, laminate film layers 2 which are respectively arranged with said core layer 1 held therebetween, and cover case layers 3 which are respectively arranged as outer layers of the corresponding laminate film layers 2, thereby to form a sandwich structure.

(3) In the apparatus cover case structure, the electric element is a passive element such as capacitor.

(4) In the apparatus cover case structure, the electric element is a lithium battery.

(5) In the apparatus cover case structure, said cover case layers 1 are made of a CFRR material.

(6) In the apparatus cover case structure, the sandwich structure is in a curved shape.

(7) In an electronic apparatus wherein predetermined constituent members are disposed in an apparatus housing, an electronic apparatus wherein the apparatus housing is formed including said apparatus cover case structure as defined in any of the above items (1) through (5).

BRIEF DESCRIPTION OF THE DRAWINGS

FIG. 1 is a sectional explanatory view showing an embodiment of an apparatus cover case according to the present invention;

FIG. 2 is a sectional explanatory view showing another embodiment of an apparatus cover case according to the present invention;

FIG. 3 is a sectional explanatory view showing an embodiment of an apparatus cover case according to the present invention as is constructed in the shape of curved layers; and FIG. 4 is an external perspective view of a portable telephone which is an embodiment of an electronic apparatus constructed including the apparatus cover case structure of the present invention as an apparatus housing.

PREFERRED EMBODIMENTS OF THE INVENTION

Now, embodiments of an apparatus cover case and an electronic apparatus according to the present invention will be described in detail with reference to the accompanying drawings.

FIG. 1 is a sectional explanatory view showing an embodiment of an apparatus cover case according to the present invention, while FIG. 2 is a similar explanatory view showing another embodiment. Also, FIG. 3 is a sectional explanatory view showing an embodiment in which an apparatus cover case according to the present invention is constructed as a curved structure. Besides, FIG. 4 is an external perspective view of a portable telephone which is an embodiment of an electronic apparatus constructed including the apparatus cover case structure of the present invention as an apparatus housing.

Each of the apparatus cover cases shown in FIGS. 1 and 2 is constructed in a flat shape, whereas the apparatus cover case shown in FIG. 3 is constructed in a curved shape. The portable telephone shown in FIG. 4 is one example of the electronic apparatus, and the housing thereof includes the apparatus cover case structure. In such an electronic apparatus, various electronic elements and electric components, etc. are installed within the housing. The housing of the electronic apparatus, namely, the apparatus cover case is formed of flat surfaces and curved surfaces in combination in its external appearance as seen from FIG. 4.

In this manner, the apparatus cover case of the electronic apparatus corresponds to three cases; 1) where it is formed of flat surfaces, 2) where it is formed of curved surfaces, and 3) where it is formed of flat and curved surfaces in combination. The present invention is applicable to any of the cases.

A sheet-like core layer 1 is formed having an electric element. Herein, the electric element may be constructed of either the whole core layer 1 or part of the core layer 1. This electric element may be a passive element such as capacitor, or may well be a battery such as lithium battery. A polymer lithium battery, a solid-state lithium battery or the like is applicable as the lithium battery, and it is convenient for realizing the three-dimensional multilevel shape of the apparatus cover case. Besides, the present invention can be applied to a solid electrolyte capacitor likewise to the battery.

The embodiment in FIG. 1 defines a sandwich structure in which the sheet-like core layer 1 including the electric element has both its sides covered with cover case layers 3.

Besides, the embodiment in FIG. 2 is so constructed that laminate film layers 2 are further added as intervening layers. That is, this embodiment defines a sandwich structure in which the sheet-like core layer 1 including the electric element has both its sides covered with the laminate film layers 2 and the cover case layers 3. The laminate film layers 2 serve to protect the element-including core layer 1 from moisture and oxygen which are contained in the open air. By the way, in order to seal the core layer 1 including the electric element, a sealing portion 4 should preferably be provided from the structural aspect of the cover case.

Herein, the embodiment in FIG. 1 can also be considered as the structure in which the cover case layer 1 and the laminate film layer 2 in each pair as shown in FIG. 2 are united into an integral type cover case layer (layer 1+layer 2). In this case, however, the material property of the single cover case layer 1 in FIG. 1 needs to be equivalent to that of the laminate film layer 2 when the same purpose as that of the double-layer structure is to be achieved. Therefore, the cover case layer 1 in FIG. 1 should preferably be made of a material the property of which is equivalent to that of the laminate film layer 2 in FIG. 2.

In order to hold the strength of the apparatus cover case sufficient, at least either of the two layers; outer layer 3 and inner layer 2 in FIG. 2 needs to be made of CFRP. This expression "CFRP" is short for "Carbon-Fiber-Reinforced Plastics". It is, of course, possible to adopt the CFRP material for the integral type cover case layer (layer 3+layer 2), as shown in FIG. 1. Thus, the strength as the apparatus cover case can be satisfactorily ensured.

Regarding a built-in battery which is included as an electric element in an electronic apparatus, a polymer lithium battery has recently been developed. A conventional lithium ion battery requires a metal case in order to avoid the leakage of an electrolyte, whereas the polymer lithium battery contains an electrolyte which is a gelled substance and which does not leak out even when a high pressure is exerted on the battery from outside.

For such a reason, a light package employing laminate film layers can be applied to the polymer lithium battery, and a considerably thin-walled structure can be obtained as the battery itself. Therefore, the polymer lithium battery is suited to define the three-dimensional multilevel shape which can incarnate the present invention.

With the light package only, however, the battery is scanty of flexibility, and its internal structure which includes two electrodes and an electrolyte layer is prone to be destroyed by an external force. Accordingly, a protective cover case for preventing the destruction has been always necessitated.

In case of employing the protective cover case, thinning based on the light package which features the polymer lithium battery is spoilt, and the merit of the polymer lithium battery over the ordinary lithium ion battery lessens.

According to the present invention, the apparatus cover case can serve also as such a protective cover case, and hence, the feature of the polymer lithium battery permitting the thinned structure can be fully exploited.

Meanwhile, a solid aluminum electrolyte capacitor whose cathode is made of an electroconductive polymer is currently under development, and the present invention is also applicable to the electrolyte capacitor. At present, the capacitor of such type is manufactured as a separate component of chip type, and is designed in adaptation to surface mounting technology. Moreover, the present invention is applicable in fabricating a capacitor of three-dimensional multilevel type.

By way of example, a solid electrolyte capacitor of desired three-dimensional multilevel shape can be offered by performing the following steps:

1) Molding aluminum foil into a desired shape
2) Electrochemically etching the molded aluminum foil
3) Anodizing the etched aluminum foil
4) Chemically polymerizing pyrrole on the surfaces of the anodized aluminum foil
5) Electrolytically polymerizing the pyrrole with electrodes being the chemically polymerized pyrrole formed on the surfaces of the aluminum foil
6) Coating the resulting aluminum foil surfaces with current collecting layers made of a carbon paste, a silver paste or the like
7) Overcoating the current collecting layers with protective layers As described above, the capacitor of the specified type in the prior art is manufactured as the chip type by molding and assembling several flat small constituents. In contrast, the capacitor according to the present invention is not molded, but it is covered with the laminate films. The dielectric layer of the capacitor thus obtained is made of an aluminum oxide. Since the aluminum oxide is very fragile, the dielectric layer is easily destroyed by an external stress, to incur short-circuiting. In the aspect of a simple laminate pack, accordingly, the capacitor cannot be employed as the component of the three-dimensional shape. According to the present invention, the disadvantages are overcome by the apparatus cover case, and the capacitor can be put into practical use.

The electric element in the three-dimensional multilevel shape is highly practicable when constructed and applied as the polymer lithium battery, the solid electrolyte capacitor or the like device. In the prior art, however, such a device requires a protective cover case in practical use, and the thickness and price of the whole electronic apparatus are increased by the cover case. A material having a high physical strength (tensile elasticity) needs to be employed for thinning the cover case, and it is very expensive.

The CFRP is a material which is the toughest per unit weight, and it is extensively used for airplanes, space shuttles, sports cars for professionals, etc. Although the use of the CFRP for a mobile communication terminal or the like seems to be unreasonably expensive, the CFRP is highly capable of incarnating the cover case of the electronic apparatus. When each cover case layer is made of the CFRP material, it may be very thin, and the texture of its surface is fine and affords a good external appearance.

By way of example, in an apparatus cover case structure in which each cover case layer is made of the CFRP material by applying the present invention, a lithium polymer battery of 800 mAh has dimensions of 93 (width)×140 (length)×1.5 (thickness) mm. The thickness value is much superior to a thickness value in a prior-art cover case.

According to the present invention thus far described, excellent effects as stated below are demonstrated in correspondence with the appended claims:

(1) An apparatus cover case structure comprises a sheet-like core layer 1 which includes an electric element, and cover case layers 3 which are respectively arranged as outer layers holding said core layer 1 therebetween, thereby to form a sandwich structure, and hence, it can contribute to reducing the size of an electronic apparatus, lightening the weight thereof, and thinning the structure thereof by a very simple construction.

(2) An apparatus cover case structure comprises a sheet-like core layer 1 which includes an electric element, laminate film layers 2 which are respectively arranged with said core layer 1 held therebetween, and cover case layers 3 which are respectively arranged as outer layers of the corresponding laminate film layers 2, thereby to form a sandwich structure, and hence, the material of the cover case layers 3 can be selected more versatilely by interposing the laminate film layers 2, so that the apparatus cover case layer can contribute, not only to reducing the size of an electronic apparatus, lightening the weight thereof, and thinning the structure thereof, but also to curtailing the cost thereof, by a very simple construction.

(3) In the apparatus cover case structure, the electric element is a passive element such as capacitor, and hence, it is integral with the apparatus cover case structure, so that the apparatus cover case structure contributes to thinning and compacting the electronic apparatus.

(4) In the apparatus cover case structure, the electric element is a lithium battery, and hence, the battery is integral with the apparatus cover case structure and does not occupy a large space within the electronic apparatus, so that the apparatus cover case structure contributes to thinning and compacting the electronic apparatus.

(5) In the apparatus cover case structure, said cover case layers 3 are made of a CFRP material, and hence, they can be thinned, so that lightening the weight of the whole electronic apparatus and reducing the size thereof are also promoted.

(6) In the apparatus cover case structure, the sandwich structure is in a curved shape, and hence, the apparatus cover case structure is applicable to any curved housing of the electronic apparatus, so that it has a wide range of applications and that the versatility of its design is enhanced.

(7) In an electronic apparatus wherein predetermined constituent members are disposed in an apparatus housing, the apparatus housing is formed including the apparatus cover case structure of the present invention, so that the whole apparatus can be easily thinned and compacted, and that the electronic apparatus which is superior in cost and design can be offered into the market.

What is claimed is:

1. An apparatus cover case structure comprising a sheet-like core layer which includes an electric element, and cover case layers which are respectively arranged as outer layers holding said core layer therebetween, thereby to form a sandwich structure.

2. An apparatus cover case structure comprising a sheet-like core layer which includes an electric element, laminate film layers which are respectively arranged with said core layer held therebetween, and cover case layers which are respectively arranged as outer layers of the corresponding laminate film layers, thereby to form a sandwich structure.

3. An apparatus cover case structure as defined in claim 1, wherein the electric element is a passive element such as capacitor.

4. An apparatus cover case structure as defined in claim 1, wherein the electric element is a lithium battery.

5. An apparatus cover case structure as defined in claim 1, wherein said cover case layers are made of a Carbon-Fiber-Reinforced-Plastics material.

6. An apparatus cover case structure as defined in claim 1, wherein the sandwich structure is in a curved shape.

7. An electronic apparatus wherein predetermined constituent members are disposed in an apparatus housing, and wherein the apparatus housing is formed including an apparatus cover case structure comprising a sheet-like core layer which includes an electric element, and cover case layers which are respectively arranged as outer layers holding said core layer therebetween, thereby to form a sandwich structure.

8. An apparatus cover case structure as defined in claim 2, wherein the electric element is a passive element such as capacitor.

9. An apparatus cover case structure as defined in claim 2, wherein the electric element is a lithium battery.

10. An apparatus cover case structure as defined in claim 2, wherein said cover case layers are made of a Carbon-Fiber-Reinforced-Plastics material.

11. An apparatus cover case structure as defined in claim 3, wherein said cover case layers are made of a Carbon-Fiber-Reinforced-Plastics material.

12. An apparatus cover case structure as defined in claim 4, wherein said cover case layers are made of a Carbon-Fiber-Reinforced-Plastics material.

13. An apparatus cover case structure as defined in claim 2, wherein the sandwich structure is in a curved shape.

14. An apparatus cover case structure as defined in claim 3, wherein the sandwich structure is in a curved shape.

15. An apparatus cover case structure as defined in claim 4, wherein the sandwich structure is in a curved shape.

16. An apparatus cover case structure as defined in claim 5, wherein the sandwich structure is in a curved shape.

17. An electronic apparatus wherein predetermined constituent members are disposed in an apparatus housing, and wherein the apparatus housing is formed including an apparatus cover case structure comprising a sheet-like core layer which includes an electric element, laminate film layers which are respectively arranged with said core layer held therebetween, and cover case layers which are respectively arranged as outer layers of the corresponding laminate film layers, thereby to form a sandwich structure. material.

18. An electronic apparatus wherein predetermined constituent members are disposed in an apparatus housing, and wherein the apparatus housing is formed including an apparatus cover case structure comprising a sheet-like core layer which includes an electric element, wherein the electric element is a passive element such as a capacitor.

19. An electronic apparatus wherein predetermined constituent members are disposed in an apparatus housing, and wherein the apparatus housing is formed including an apparatus cover case structure comprising a sheet-like core layer which includes an electric element, wherein the electric element is a lithium battery.

20. An electronic apparatus wherein predetermined constituent members are disposed in an apparatus housing, and wherein the apparatus housing is formed including an apparatus cover case structure comprising a sheet-like core layer which includes an electric element, and cover case layers which are respectively arranged as outer layers holding said core layer therebetween, thereby to form a sandwich structure, wherein said cover case layers are made of a Carbon-Fiber-Reinforced-Plastics material.

21. An electronic apparatus wherein predetermined constituent members are disposed in an apparatus housing, and wherein the apparatus housing is formed including an apparatus cover case structure comprising a sheet-like core layer which includes an electric element, and cover case layers which are respectively arranged as outer layers holding said core layer therebetween, thereby to form a sandwich structure, wherein the sandwich structure is in a curved shape.

* * * * *